(12) United States Patent
Cho et al.

(10) Patent No.: US 6,183,835 B1
(45) Date of Patent: *Feb. 6, 2001

(54) MANUFACTURING METHOD OF REINFORCED FIBER SHEET USEFUL FOR REPAIRING/REINFORCED CONCRETE STRUCTURE

(75) Inventors: Yong Jun Cho; Sam Tae Chung; Se Hyun Cho; Il Soo Jeong, all of Kyung Nam (KR)

(73) Assignee: Moon Soo Cho, Seoul (KR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/252,822

(22) Filed: Feb. 19, 1999

Related U.S. Application Data

(63) Continuation-in-part of application No. 08/917,813, filed on Aug. 27, 1997, now abandoned.

(51) Int. Cl.[7] .............................. B32B 17/04; B32B 3/10; B32B 5/08; B32B 5/10; B32B 5/28
(52) U.S. Cl. ......................... 428/113; 428/107; 428/114; 442/43; 442/46; 442/49; 442/150; 442/181; 442/304; 156/290; 156/292; 52/DIG. 7
(58) Field of Search ................................ 156/62.2, 62.8, 156/324, 290, 292; 264/109, 112, 113; 52/DIG. 7; 428/107, 113, 114; 442/43, 46, 49, 150, 181, 304

(56) References Cited

U.S. PATENT DOCUMENTS

| | | |
|---|---|---|
| 4,668,325 | * 5/1987 | Katz . |
| 5,151,146 | * 9/1992 | Green . |

FOREIGN PATENT DOCUMENTS

| | | |
|---|---|---|
| 0441519 | 8/1991 | (EP) . |
| 0500990 | 9/1992 | (EP) . |
| 0598591 | 5/1994 | (EP) . |
| 1167764 | 11/1958 | (FR) . |

* cited by examiner

Primary Examiner—Sam Chuan Yao
(74) Attorney, Agent, or Firm—Jacobson, Price, Holman & Stern, PLLC

(57) ABSTRACT

A reinforced fiber sheet for use in repairing/reinforcing concrete structures including a net-shaped fabric substrate and reinforcing fibers uni-directionally and uniformly arranged on either side or both sides thereof. Also, a reinforced fiber sheet for use in repairing/reinforcing concrete structured including a first and a second substrate and reinforcing fibers uni-directionally and uniformly interposed between the first and second substrates. The substrate is a net-shaped fabric formed by cross-arranging organic or inorganic fiber strands and impregnating them with thermoplastic resins, and the reinforcing fiber is attached and bonded to the substrate by the thermoplastic resin.

2 Claims, 8 Drawing Sheets

MANUFACTURING METHOD OF REINFORCED FIBER SHEET USEFUL FOR REPAIRING/REINFORCED CONCRETE STRUCTURE

CROSS-REFERENCE TO RELATED APPLICATION

The present application is a CIP application of U.S. Ser. No. 08/917,813 filed Aug. 27, 1997 abandoned.

BACKGROUND OF THE INVENTION

1. Field of the Invention

The present invention relates to a reinforced fiber sheet for use in repairing and/or reinforcing concrete structures. More particularly, the invention relates to a reinforced fiber sheet containing substantially no adhesive resin layer and comprising a net-shaped fabric substrate and reinforcing fibers uni-directionally and uniformly arranged thereon.

2. Description of the Prior Art

The The work life of concrete structures that contain concrete as the main structural material, such as ferroconcrete bridges, elevated expressways, tunnels, buildings, etc., is considered to be semi-permanent. Moreover, various post-construction side effects have been known to sometimes occur with these types of structures. These side effects result from the neutralization of the materials used, cracks due to rust and expansion of the iron skeleton, surface peeling, structural defects, or the use of low grade concrete and other construction materials. Furthermore, such side effects may also result from poor quality construction, traffic overload or the accumulation of an increased traffic load, and chemical reactions with salts and contaminated materials while under construction.

Because of such side effects, post-construction repairing/reinforcing processes may often be required, such as methods for reinforcing with steel panels, reinforced fiber sheets or with an appropriate combination thereof.

The reinforcement process of the prior art usually utilizes reinforced fiber sheets for repairing/reinforcing concrete structures. This fiber reinforcing method comprises the steps of placing an anchor plate (2) on the surface of a concrete structure to be repaired/reinforced and fixing it to the concrete structure with a bolt (3), attaching a reinforced fiber sheet (4) to both sides and bottom of the structure and fixing the sheet to the plate with a bracket (5), as shown in FIG. 1a. An alternative method may comprise of attaching a reinforced fiber sheet (4) to both sides and bottom of the structure, but without an anchor plate on the surface of the concrete structure, and directly fixing the sheet to the concrete structure with a bolt (6), as shown in FIG. 1b.

For example, a reinforced fiber sheet as disclosed in EP 441519 A1, which is shown in FIGS. 2a and 2b, may be applied to the above fiber reinforcing processes. As shown in FIG. 2a, the reinforced sheet (4) comprises a substrate (a) and reinforcing fibers (c) uni-directionally arranged thereon through an interposed adhesive layer (b) between said substrate and reinforcing fibers. Alternatively, the sheet may comprise a first and a second substrate and reinforcing fibers uni-directionally interposed between said substrates by means of adhesive layers, as shown in FIG. 2b.

As described above, conventional reinforcing sheets (4,5) generally include an integrated composite consisting of a substrate and reinforcing fibers uni-directionally arranged on either side thereof through an adhesive resin layer in a film shape between said substrate and reinforcing fibers. That is, conventional reinforced sheets essentially use an adhesive resin film in order to hold the unidirectional arrangement of reinforcing fibers on the substrate. Said adhesive resin film melts and permeates into the reinforcing fibers to form an adhesive resin layer over the fibers when the composite is compressed with heating to obtain a reinforced fiber sheet. Such a reinforced fiber sheet is referred to as a resinous reinforced fiber sheet, i.e. a prepreg.

When repairing and/or reinforcing concrete structures using such conventional resinous reinforced fiber sheets, a liquid cold-setting matrix resin is first applied to the surface of the concrete structure and the reinforced fiber sheet is then attached thereto.

Thereafter, the matrix resin penetrates into the reinforcing fibers of the sheet. Due to the adhesive resin layer that is formed over the reinforcing fibers, however, the matrix resin penetrates into the reinforcing fibers too slowly. That is, the above resinous reinforced fiber sheet contains sticky adhesive resin, which acts as a barrier against the permeation into the reinforcing fiber of the matrix resin that has been applied to the surface of the concrete structure undergoing repair/reinforcement.

Further, since the adhesive resin layer that is formed over the reinforcing fibers increases the structural density of the reinforcing fibers, it is difficult for matrix resin to permeate into the reinforcing fibers. Thus, the reinforced fiber sheet is liable to peel away from the concrete structure. Also, since it is difficult to remove air bubbles from the applied matrix resin, additional processing is required to acquire the desired adhesive strength.

Consequently, the use of the conventional resinous reinforced fiber sheet in repairing and/or reinforcing concrete structures undesirably lengthens the time of the work process and diminishes workability.

In addition, compression process, for example rolling process, are used to press the matrix resin into the reinforced fiber sheet. However, since this requires compression very high-powered, distortion in the shape of the reinforced fiber sheet can easily occur, resulting in a weakening of the reinforced sheet.

SUMMARY OF THE INVENTION

It is an object of the invention to provide an improved reinforced fiber sheet for use in repairing/reinforcing concrete structures.

According to the first embodiment of the present invention, a reinforced fiber sheet for use in repairing/reinforcing concrete structures is provided, which comprises:
  a substrate; and
  reinforcing fibers uni-directionally and uniformly arranged on either side thereof,
  wherein said substrate is a net-shaped fabric formed by cross-arranging organic or inorganic fiber strands in two or more directions and then impregnating them with a thermoplastic resin,
  said reinforcing fibers are attached and bonded to said substrate by means of said thermoplastic resin, and
  said sheet is free from adhesive resin layers.

According to the second embodiment of the invention, a reinforced fiber sheet for use in repairing/reinforcing concrete structures is provided, which comprises:
  a substrate; and
  reinforcing fibers uni-directionally and uniformly arranged on both sides thereof, wherein said substrate is a net-shaped fabric formed by cross-arranging organic or inorganic fiber strands in two or more directions and then impregnating them with a thermoplastic resin, said reinforcing fibers are attached and bonded to said substrate by means of said thermoplastic resin, and said sheet is free from adhesive resin layers.

According to the third embodiment of the invention, a reinforced fiber sheet for use in repairing/reinforcing concrete structures is provided, which comprises:

a first and a second substrate; and reinforcing fibers uni-directionally and uniformly interposed between said first and second substrates, wherein said substrates are a net-shaped fabric formed by cross-arranging organic or inorganic fiber strands in two or more directions and then impregnating them with a thermoplastic resin, said reinforcing fibers are attached and bonded to said substrates by means of said thermoplastic resin, and said sheet is free from adhesive resin layers.

BRIEF DESCRIPTION OF THE DRAWINGS

FIG.s 1a and 1b illustrate the method for repairing/reinforcing a concrete structure using a reinforced fiber sheet.

DETAILED DESCRIPTION OF THE INVENTION

Figure 1A:
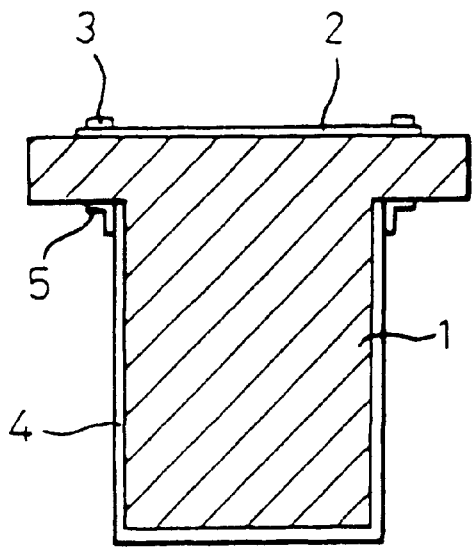
Figure 1B:
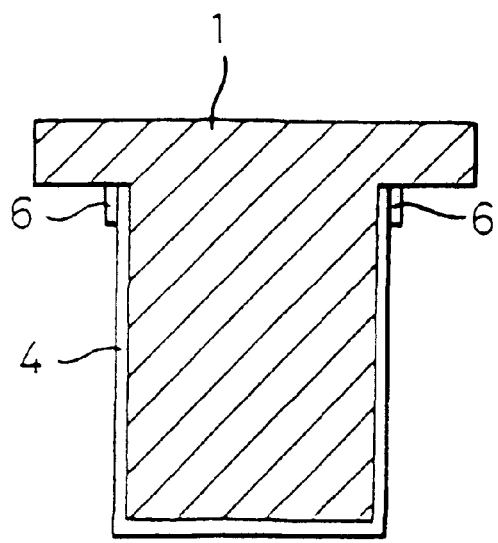
Figure 2A:
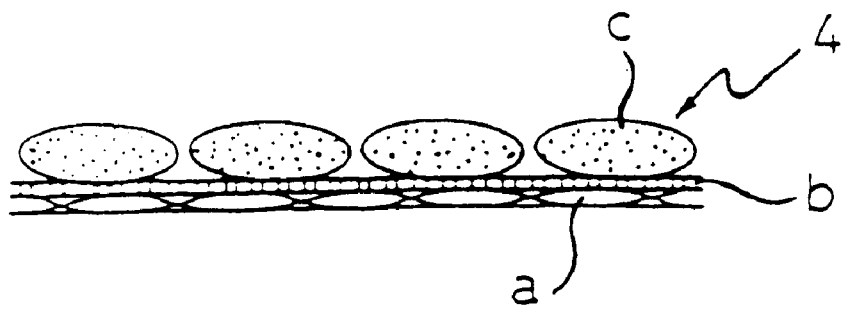
FIGS. 2a and 2b show a reinforced fiber sheet of the prior art.
Figure 2B:
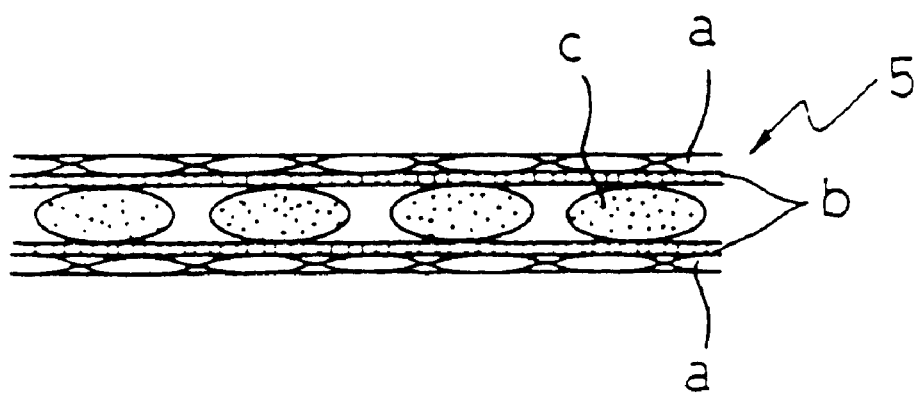
Figure 3:
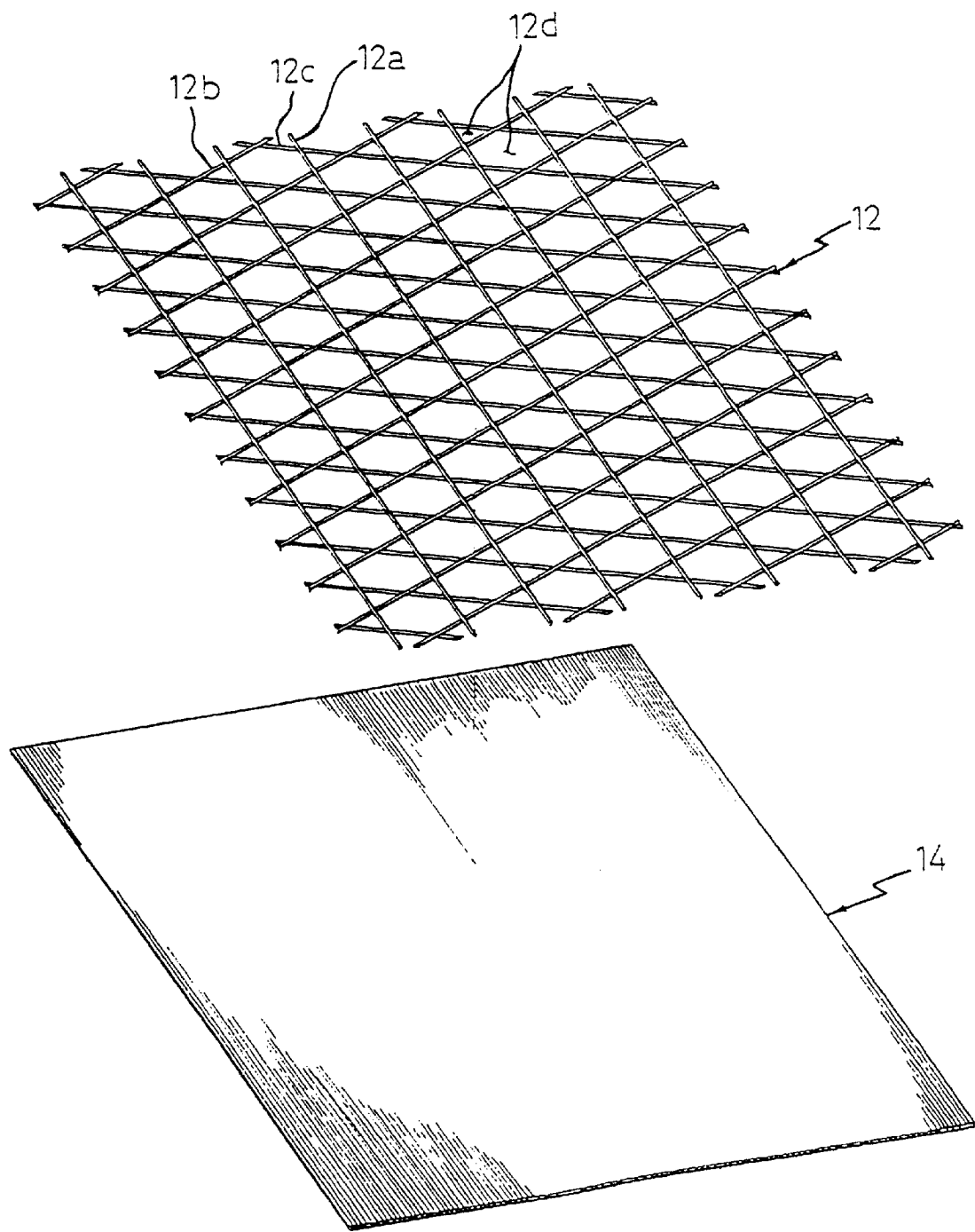
FIG. 3 shows the separate layers of a reinforced fiber sheet for repairing reinforcing concrete structures according to the invention.

In order to solve the problems encountered in the above prior art techniques, we, the present inventors, have conducted extensive studies aimed at improving a reinforced fiber sheet. As a result, it has been found that the permeability of a cold-setting matrix resin into a reinforced fiber sheet is significantly improved by using a reinforced fiber sheet that comprises a net-shaped fabric substrate and reinforcing fibers uni-directionally arranged thereon without an adhesive resin layer. There are many advantages to using the reinforced fiber sheet of the invention in that the workability of repairing/reinforcing concrete structures can be improved, the work time can be shortened, and the repair/reinforcement capacity of the reinforced fiber sheet can be improved through the forming of a bonded complex of the concrete structure with reinforced fiber sheet.

The organic and inorganic fibers used in preparing the net-shaped fabric substrate of the invention may be one or more of the following: carbon fiber, glass fiber, cabulla fiber, aramid fiber, cotton fiber, nylon fiber or polyester fiber.

As described above, there is no adhesive resin layer in the reinforced fiber sheet of the invention. The adhesion of reinforcing fibers to the net-shaped fabric substrate is effected only by means of thermoplastic resin impregnated onto the fiber strands of the substrate. Further, void spaces are formed in the regions between the intersecting fiber strands of the substrate since the adhesive resin is not present over the substrate, but only on the fiber strands thereof. Thus, when repairing/reinforcing concrete structures, a matrix resin applied on the concrete structure can quickly permeate into the reinforced fiber sheet, so that air bubbles are not generated and thus the strength of adhesion between the reinforced fiber sheet and the concrete structure increases remarkably.

The thermoplastic resin used in the invention is preferably a solid form having high viscosity and non-flowability at room temperature in order to maximize the non-resinous area of the reinforcing fibers. Generally, the thermoplastic resin, which may be used in the reinforced fiber sheet of the invention, is at least one selected from the group consisting of polyolefins, polyvinyl chlorides, polytetrafluoroethylenes, polyesters, polyacrylates, polyurethanes and polyaramids. Preferably, the thermoplastic resin is polyurethanes or polyacrylates. The thermoplastic resin impregnated into the fiber strands of the substrate easily takes on an adhesive state for reinforcing the fibers by means of applying heat and compression.

Further, since there is no adhesive resin layer in the reinforced fiber sheet of the invention, storage stability of the sheet improves. Because the adhesive resin is present only on the fiber strands of the substrate, the permeability of the liquid matrix resin that is applied to the concrete structure is significantly improved. Therefore, there is no need for the additional process of permeating the matrix resin into the reinforced fiber sheet. Consequently, there seldom occurs shape distortion of the reinforced fiber sheet, which increases the mechanical strength of the repaired/reinforced concrete structure.

As described above, the reinforced fiber sheet of the invention has improved workability and durability and also provides the many advantages of easy handling, an abbreviated process and the maintenance of uniform strength in the processes of repairing/reinforcing concrete structures.

DESCRIPTION OF THE PREFERRED EMBODIMENTS

A preferred embodiment of the present invention will be illustrated in greater detail with reference to the accompanying Drawings.

As shown in FIGS. 3 to 6, the reinforced fiber sheet (10) of the invention comprises a net-shaped fabric substrate (12) impregnated with thermoplastic resin that is dried and reinforcing fibers (14) that are uni-directionally and uniformly arranged thereon.

The substrate of the reinforced fiber sheet of the invention is a net-shaped fabric comprising a first fiber strand in a perpendicular direction (12a), a second fiber strand (12b) and a third fiber strand (12c) opposed thereto. Thus, a plurality of void spaces (12d) are formed in the regions between the cross sections of the first, second and third fiber strands, and the adhesion of the reinforcing fibers to the fiber strands of the substrate is made only on said fiber strands, not on the void spaces. As a result, air and matrix resin permeabilities of the sheet largely increase, so that the liquid matrix resin applied to the concrete structure can quickly penetrate into the reinforced fiber sheet without the generation of air bubbles. Therefore, the use of the reinforced fiber sheet of the invention allows a substantial shortening of the work time and strengthens considerably the adhesion between the concrete structure and the reinforced fiber sheet.

Although the invention is described as a reinforced fiber sheet comprising a substrate consisting of three-directional fiber strands, it may further comprise a substrate consisting of only two directional fiber strands, such as latitudinal and longitudinal fiber strands.

Figure 7:
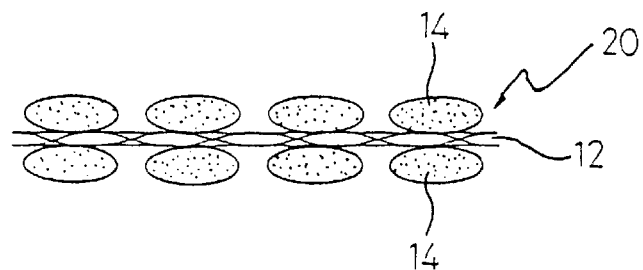
FIG. 7 shows a schematic section of the reinforced fiber sheet of another preferred embodiment of the invention.

As shown in FIG. 7, the reinforced fiber sheet (20) of the invention can be also produced by placing reinforcing fibers (14) on both sides of a substrate (12), and melt-compressing them by means of heat and compression to attach the fibers to the substrate.

The substrate (12) of the invention may also be a net-shaped form of two-directional or three-directional fiber strands as described above.

Figure 8:
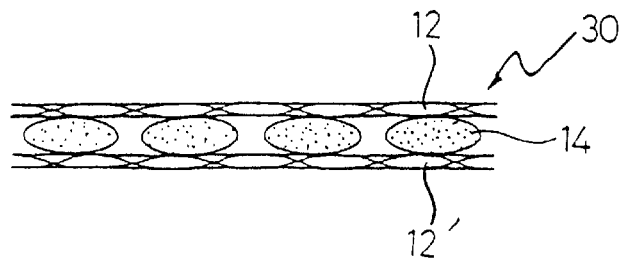
FIG. 8 shows a schematic section of the reinforced fiber sheet of another preferred embodiment of the invention.

FIG. 8 shows a schematic section of another preferred embodiment of a reinforced fiber sheet according to the invention. As shown in FIG. 8, the sheet (30) may be produced by interposing reinforcing fibers (14) between a first and a second substrate (12), and melt-compressing them by means of heat and compression to attach the fibers to the substrate.

Figure 9A:
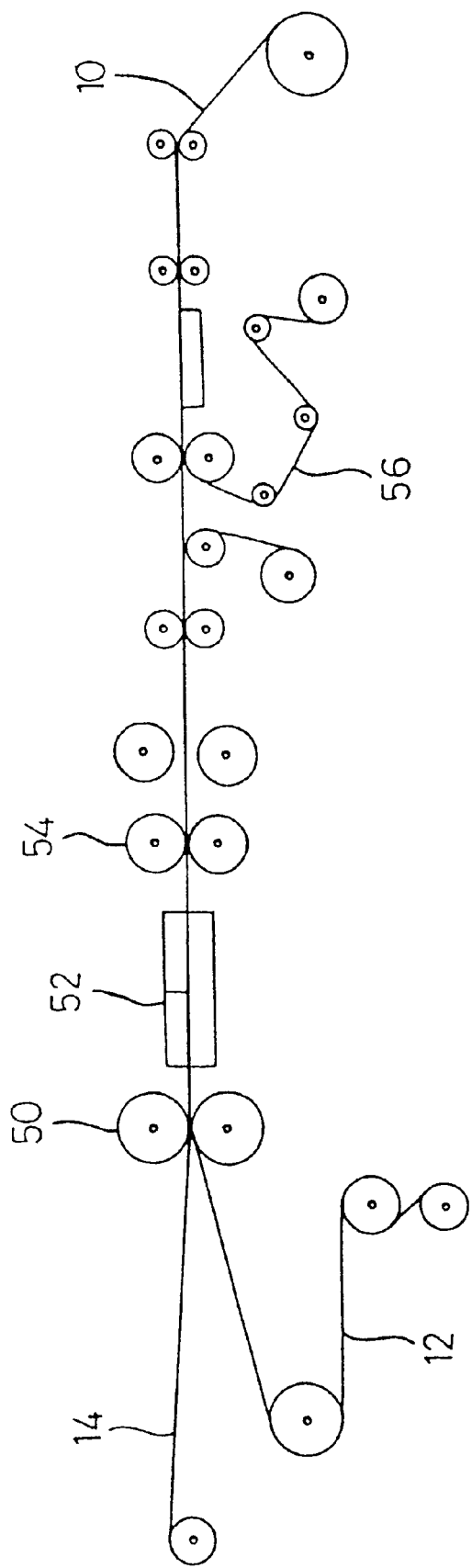
FIGS. 9a, 9b and 9c illustrate the process for producing the reinforced fiber sheet of the invention as shown in FIGS. 4, 7 and 8, respectively.
Figure 9B:
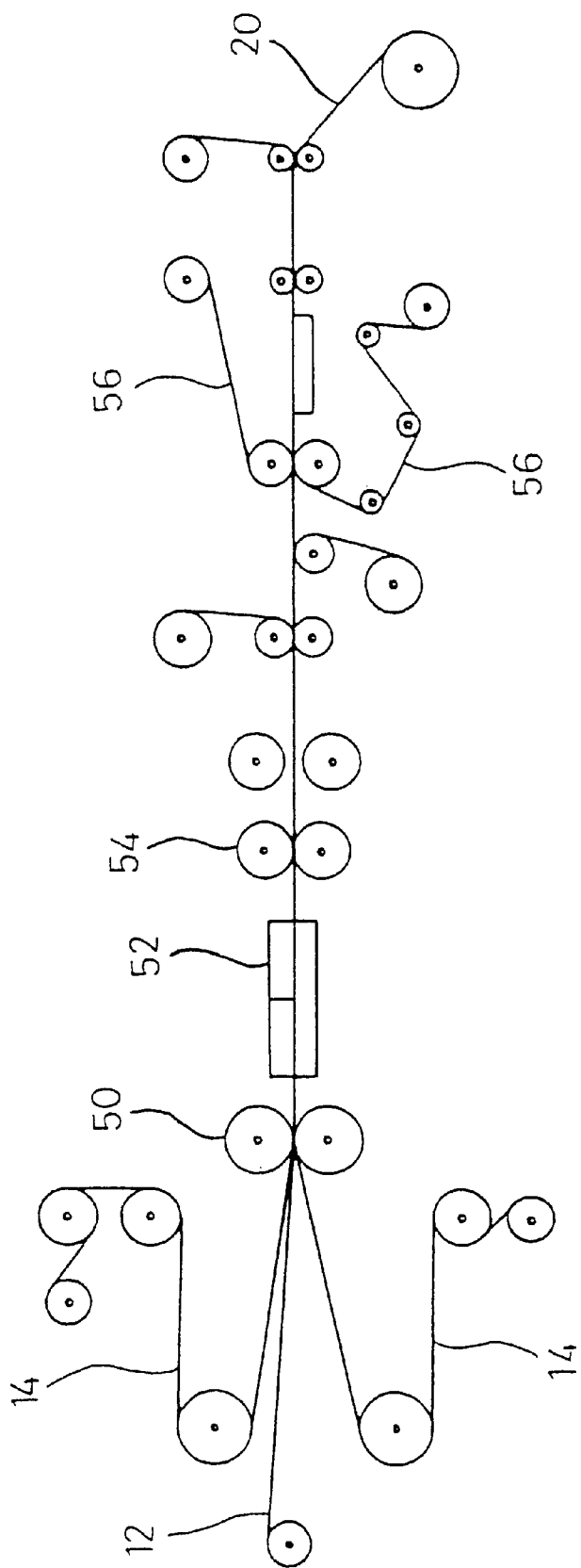
Figure 9C:
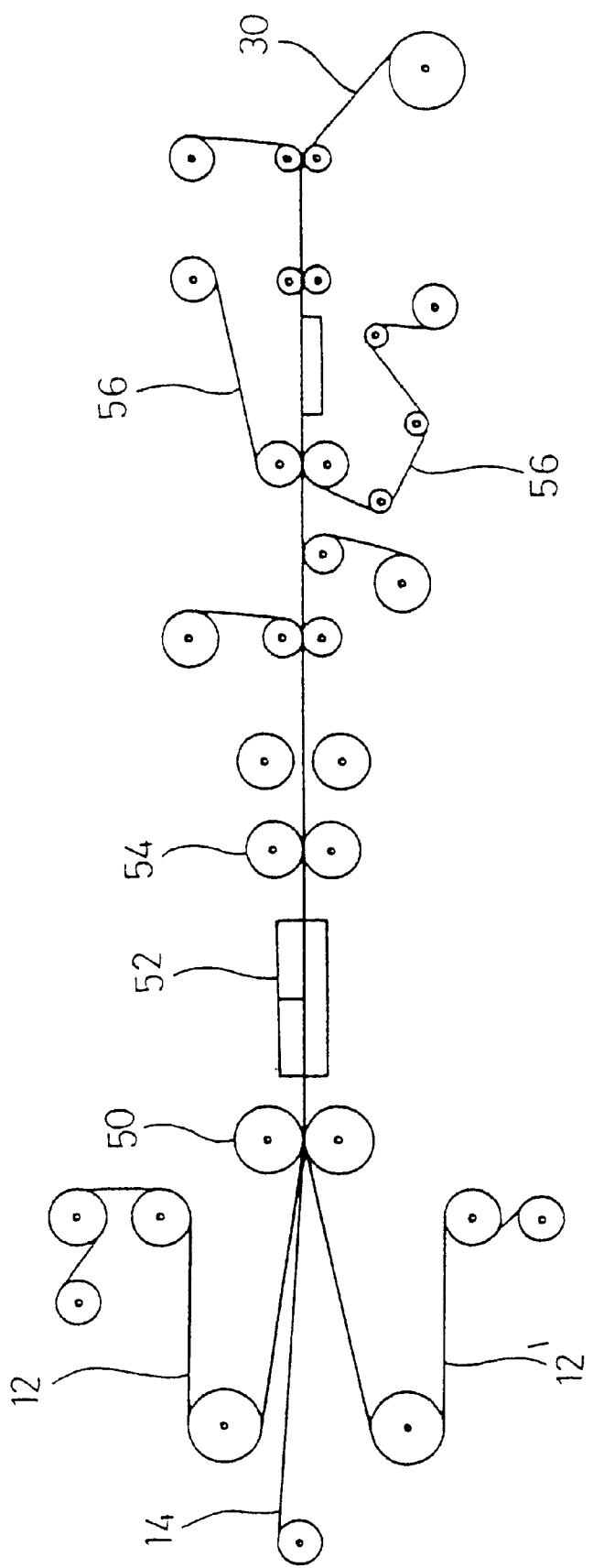

Further, the reinforced fiber sheet of the invention may be produced using the production arrangements exemplified in FIGS. 9a, 9b and 9c.

Figure 4:
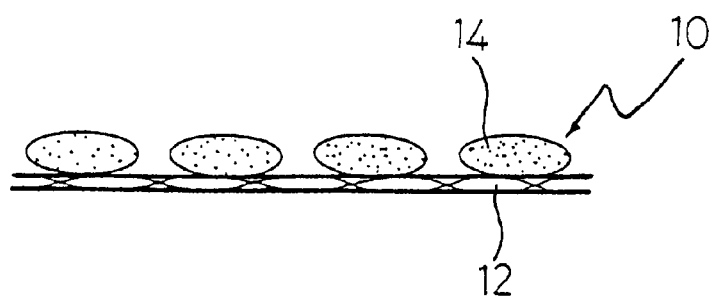
FIG. 4 shows a cross-section of the reinforced fiber sheet in FIG. 3.
Figure 5:
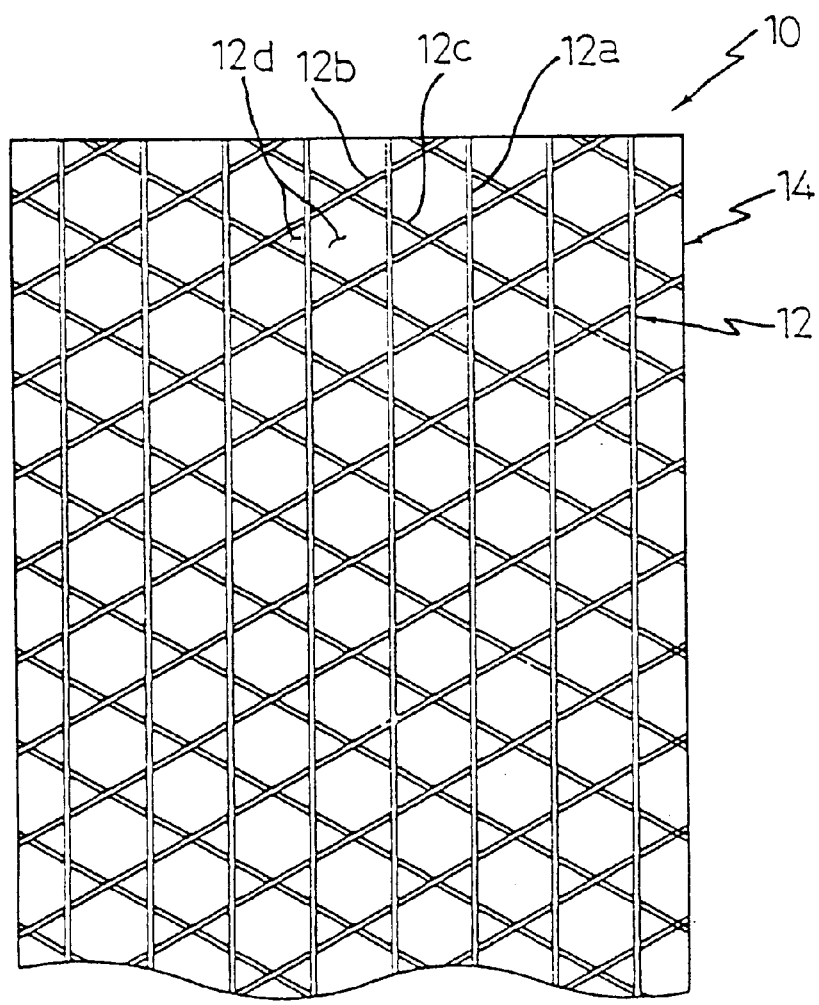
FIG. 5 shows a top view of the reinforced fiber sheet.
Figure 6:
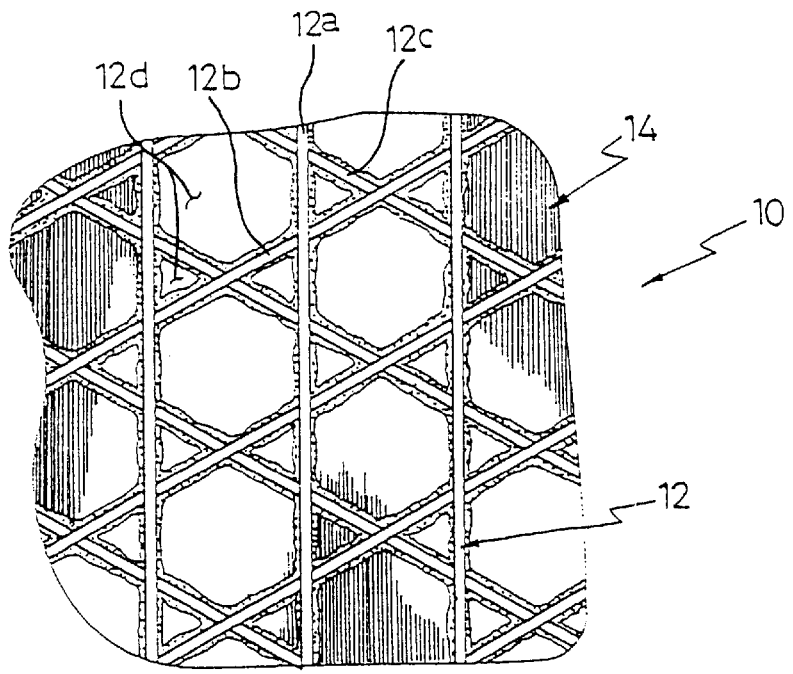
FIG. 6 shows a magnified view of the reinforced fiber sheet.

Hereinafter, methods of preparing the reinforced fiber sheet of the invention, as shown in FIGS. 4, 7 and 8, will be described with reference to FIGS. 9a to 9c.

FIG. 9a illustrates an arrangement for producing the reinforced fiber sheet (10) as shown FIG. 4.

As shown in FIG. 9a, while paying out a net-shaped fabric substrate (12) that is wound on a roller, which has been prepared in advance by the impregnation of thermoplastic resin and drying, reinforcing fibers (14) are uni-directionally and uniformly placed on either side of said substrate, and passed through pressurizing rollers (50) to arrange the reinforcing fibers on the substrate. The reinforcing fibers arranged on the substrate are then passed through a heater (52) and melt-compressed by being passed through bonding rollers (54), whereby the reinforcing fibers (14) are pressurized and adhered to said substrate (12) by means of the thermoplastic resin impregnated into the fiber strands of the substrate. Thereafter, for easy storage of the resulting reinforced fiber sheet, a detachable release paper (56) may be attached to the backing of the sheet which is then wound on a roller.

FIG. 9b illustrates an arrangement for producing the reinforced fiber sheet (20) as shown in FIG. 7.

As shown in FIG. 9b, while paying out a net-shaped fabric substrate (12) wound on a roller, which has been prepared in advance by the impregnation with a thermoplastic resin and drying, reinforcing fibers (14) are uni-directionally and uniformly placed on both sides of said substrate, and passed through pressurizing rollers (50) to arrange the reinforcing fibers (14) on the substrate. The reinforcing fibers arranged on the substrate are then passed through a heater (52) and melt-compressed by being passed through bonding rollers (54), whereby the reinforcing fibers (14) are pressurized and adhered to said substrate (12) by means of the thermoplastic resin impregnated into the fiber strands of the substrate. Thereafter, for easy storage of the resulting reinforced fiber sheet, detachable release papers (56) may be attached to the backing of the sheet which is then wound on a roller.

FIG. 9c illustrates an arrangement for producing the reinforced fiber sheet (30) as shown in FIG. 8.

As shown in FIG. 9c, while paying out net-shaped fabric substrates (12, 12') wound on a roller, which has been prepared in advance by impregnation of a thermoplastic resin and drying, reinforcing fibers (14) are uni-directionally and uniformly placed between said substrates (12) (12'), and passed through pressurizing rollers (50) to arrange the reinforcing fibers (14) between the substrates. The reinforcing fibers arranged on the substrate are then passed through a heater (52) and melt-compressed by being passed through bonding rollers (54), whereby the reinforcing fibers are pressurized and adhered to said substrates (12)(12') by means of the thermoplastic resin impregnated into the fiber strands of the substrate. Thereafter, for easy storage of the resulting reinforced fiber sheet, detachable release papers (56) may be attached to the backing of the sheet which is then wound on a roller.

The many advantages to using the reinforced fiber sheet of the invention in repairing/reinforcing concrete structures, as compared with the conventional reinforced fiber sheets are set forth below:

1) A cold-setting liquid matrix resin applied on a concrete structure can quickly penetrate into the reinforced fiber sheet via void spaces in the net-shaped fabric substrate, so that the working time is shortened. Further, there is no need for roller processing to accelerate the penetration of matrix resin into the reinforced fiber sheet used, which could cause shape distortion of the reinforcing fiber sheet. Thus, it is possible to maintain the uniformity of the fiber arrangement on the substrate without additional processes.

2) Further, when repairing/reinforcing concrete structures, since the air bubbles that are generated from liquid matrix resins are easily eliminated through the void spaces in the reinforced fiber sheet, the adhesion strength of the reinforced fiber sheet to the concrete structure increases remarkably.

3) In addition, since there is substantially no sticky adhesive resin layer in the reinforced fiber sheet, it is easy to attach the reinforced fiber sheet to a bent or curved face of the concrete structure to be repaired/reinforced.

What is claimed is:

1. A repairing/reinforcing concrete structure fiber sheet comprising:

a substrate; and groups of reinforcing fibers uni-directionally and uniformly arranged and said groups of reinforcing fibers being spaced apart and free of resin directly connecting said groups of reinforcing fibers on either side thereof, said substrate being a net-shaped fabric formed by cross-arranging organic or inorganic fiber strands in two or more directions, the strands being impregnated with a thermoplastic resin, void spaces formed in regions located between intersecting fiber strands of said substrate, said group of reinforcing fibers being attached and bonded to said substrate at said fiber strands of said substrate only by said thermoplastic resin impregnated onto the fiber strands of the substrate along the fiber strands only so as to form said void spaces between said thermoplastic resin impregnated fiber strands of said substrate, and said fiber sheet including said substrate and said groups of reinforcing fibers being free from an adhesive resin layer between said substrate and said reinforcing fibers so that upon contact of said fiber sheet with a liquid matrix resin, said liquid matrix resin quickly penetrates into said fiber sheet.

2. The repairing/reinforcing concrete structure fiber sheet of claim 1, wherein said organic and inorganic fiber strands comprise one or more fibers selected from the group consisting of carbon fiber, glass fiber, cabulla fiber, aramid fiber, cotton fiber, nylon fiber and polyester fiber.

* * * * *